Aug. 4, 1936. E. E. ESSEN 2,049,644
TESTING AND WEIGHING DEVICE
Filed April 11, 1933
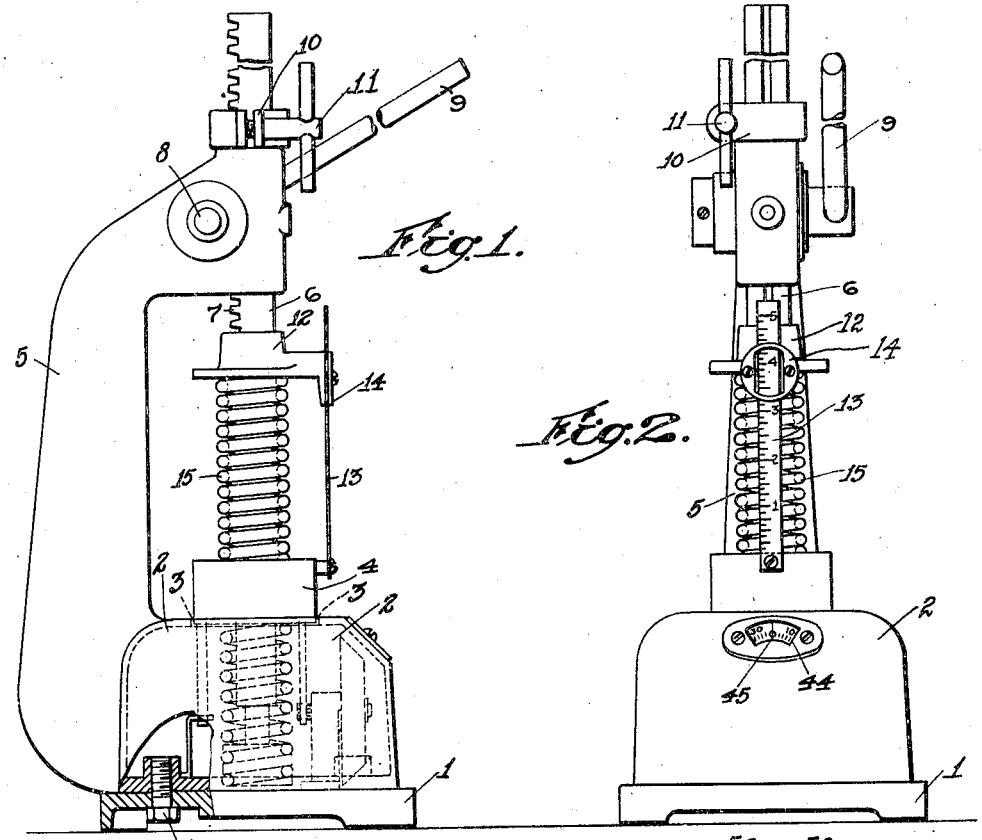
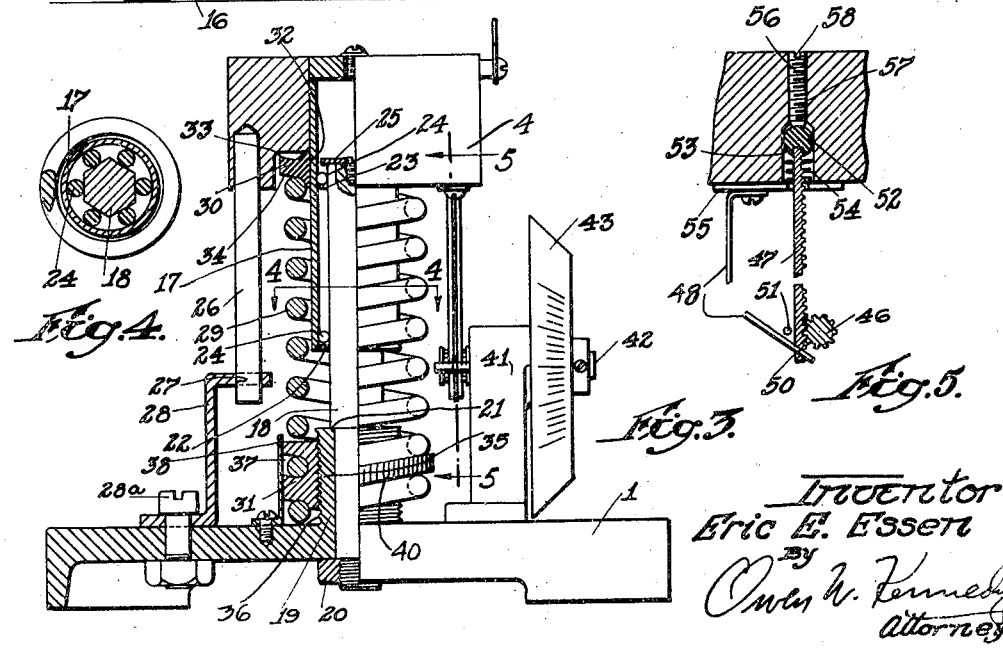
Inventor:
Eric E. Essen
by Owen W. Kennedy
Attorney Patented Aug. 4, 1936

2,049,644

UNITED STATES PATENT OFFICE 2,049,644

TESTING AND WEIGHING DEVICE

Eric E. Essen, Worcester, Mass.

Application April 11, 1933, Serial No. 665,564

8 Claims. (Cl. 265—19)

The present invention relates to an improved testing and weighing device of a type that will accurately measure the force required to compress a spring to a predetermined overall length. A testing device of this character is particularly useful for the testing of valve springs of an internal combustion engine in order to obtain a set of valve springs of exactly the same strength.

Testing devices of the above indicated character, as heretofore constructed, usually employ a coiled compression spring for yieldably supporting a testing table on which is placed the spring to be tested, with a suitable registering device calibrated for the comparison or weighing spring adapted to indicate the force applied to the spring under test. In order to readily transmit the compressive force to such a comparison or weighing spring, the ends of the spring are ground, or otherwise flattened, at right angles to the spring axis and in practice, it has been found that when a spring having squared ends is compressed between the testing table and a rigid base, the point of contact between a squared end coil and the next adjacent coil will vary in accordance with the load applied to the weighing spring.

Consequently, as a load is applied to compress the weighing spring, the points of contact of its squared end coils with the next adjacent coils will gradually creep around the periphery of the spring, thereby decreasing the effective length of the spring as well as destroying its uniform rate of resistance to compression. The above described effect gives rise to difficulties in properly calibrating a testing device employing a weighing spring with squared ends, and one of the principal objects of the present invention is to completely eliminate the above described difficulties, when using springs of this type.

According to the present invention, the end coils of the comparison or weighing spring are received in members providing helical slots, or grooves, corresponding in pitch to the normal pitch of the coil of the spring, which members also provide a connection between the ends of the spring and the weighing table and base. As the active coils of the spring leave these members at an angle so great that even solid compression of the active coils will not bring them in contact with the inner faces of the members, the active length of the working coils of the spring remains the same throughout its full range of compression. Furthermore, the effective length of the weighing spring is variable by angular adjustment of the spring receiving members about the axis of the coil.

The above and other advantageous features of the invention will hereinafter more fully appear with reference to the accompanying drawing, in which:—

Fig. 1 is a side elevation of the testing device with a spring in position for testing, parts being broken away to show the construction of the device.

Fig. 2 is a front elevation of the device of Fig. 1.

Fig. 3 is a vertical sectional view of the weighing table and associated parts.

Fig. 4 is a fragmentary horizontal section along the line 4—4 of Fig. 3.

Fig. 5 is a fragmentary vertical section along the line 5—5 of Fig. 3.

Like reference characters refer to like parts in the different figures.

Referring to the drawing, the device comprises a base 1 to which is secured a casing 2 with an opening 3 at the top thereof for freely receiving a cylindrical weighing table 4. The casing 2 has an upwardly extending bracket 5 which provides an opening in the upper end thereof through which a plunger 6 is vertically movable. The plunger 6 has a series of rack teeth 7 formed along one side thereof for engagement with a pinion, not shown, which is suitably connected to a shaft 8 provided with an operating handle 9. A split collar 10 embraces the plunger 6 and is locked in adjusted position thereon by a thumb screw 11, for the purpose of limiting the downward movement of said plunger.

The lower end of the plunger 6 carries a head 12, the under surface of which is substantially parallel to the upper surface of the weighing table 4. The table 4 carries a vertically extending scale 13 which is slidable through a guide 14 on the head 12, the guide 14 providing a mark cooperating with the graduations on the scale 13 for indicating the exact distance between the upper surface of the table 4 and the lower surface of the head 12. This distance is necessarily equal to the length of a spring 15 to be tested, when the spring is positioned, as shown, between the head 12 and the table 4.

Referring now to Figs. 1 and 3, the weighing table 4 and its associated parts are mounted on the base 1, to which is secured the casing 2 by screws 16, with the weighing mechanism enclosed within the casing 2. The cylindrical table 4 is supported for vertical movement above the base 1 by means of a hollow sleeve 17 secured to said table, which sleeve 17 receives the upper end of a guiding stud 18 projecting upwardly from the base 1. The base 1 provides a centrally located boss 19 on the upper side thereof with the stud 18 extending downwardly through an opening in the boss. The stud 18 is secured in position by a clamping nut 20 which engages the under side of the base 1 and maintains a shoulder 21 on the stud 18 against the upper end of said boss 19.

The upper portion of the stud 18 is polygonal in cross-section, as shown in Fig. 4, and where it extends within the sleeve 17 is surrounded by spacer rings 22 and 23 seated within the sleeve 17, on each of which rings is supported a series of balls 24. One ball 24 of each set is disposed between each flat surface of the hexagonal portion and the sleeve 17, and a washer 25 secured to the upper end of the stud 18 holds the parts in assembly. The provision of the balls 24 between the sleeve 17 and stud 18 provides for free movement of the table 4, vertically, with substantially no friction and at the same time prevents rocking movement of said table. In order to prevent rotation of the table 4, a rod 26 extending downwardly therefrom is movable in an opening 27 in the upper end of a clamp 28 secured to the base 1 by screw 28a.

According to the invention, a coiled weighing or comparison spring 29, which surrounds the guiding means for the table 4, yieldingly supports the table above the base 1 with its upper and lower ends respectively connected to the table 4 and to the base 1 by members 30 and 31. The comparison spring 29 has its end coils thereof spaced apart the same amount as the remaining coils and has the form conventionally known as a "plain end" spring. The upper member 30 has a bore 32 therein for the reception of the sleeve 17 and is seated in an annular recess 33 in the under side of the table 4. The periphery of member 30 is provided with a helical groove 34 corresponding in pitch to the normal pitch of the weighing spring 29 and the upper end of the spring is positioned within said groove 34, with the member 30 free to rotate about the sleeve 17 to allow the spring 29 and member 30 to turn as a unit when making initial adjustments. The member 34 has a close fit with the sleeve 17 and engages the underside of the base over a substantial area so that said member is supported against rocking movement relative to the table when the latter is moved downwardly during use.

The member 31, which receives the lower end of the spring 29, has a threaded bore 35 which engages with the threaded periphery 36 of the boss 19 and is provided with a helical groove 37 in the outer surface thereof having a pitch corresponding to the normal pitch of the coils of the spring 29. The coils of the spring 29 are turnable in this groove 37 to provide for adjustment of the effective length of the spring 29 by turning of said member 31 on the boss 19, as will hereinafter be described. The member 31 is held in position against turning movement after an adjustment, by a locking member 38 which engages notches 40 in the periphery of the member 31. The connection between the stud and the member 31 is such as to provide a substantially rigid connection between the member 31 and the base to prevent rocking of said member when the spring 29 is compressed.

The base 1 carries a bracket 41 in which an indicating shaft 42 is journaled, the latter carrying on the forward end thereof a dial 43, a portion of which is visible through an opening 44 in the casing 2, said opening having an indicating mark 45 thereon for cooperation with the indications on the dial. The opposite end of the shaft 42 carries a pinion 46 with which a rack 47 depending from the weighing table 4 engages, said rack being held in engagement with the pinion by a spring 48, the upper end of which is secured to the table 4 and the lower end of which engages a slot 50 in the lower end of the rack. A pin 51 extending from the bracket 41 in back of the rack 47 prevents the latter from jumping out of engagement with the pinion 46 against the tension of the spring 48 as a result of sudden vertical movement of the table.

As best shown in Fig. 5, the upper end of the rack 47 is secured within a spherical bearing 52, the latter being received in a bore 53 in the under side of the table and held therein by a spring 54, the upper end of which engages the spherical bearing 52 and the lower end of which engages a plate 55 secured to the under side of the table and partially covering the bore 53, said plate having an opening through which the rack 47 extends. A set screw 56 extends downwardly in a threaded bore 57 in the table 4 and the lower end thereof engages with the upper side of the bearing 52, thereby providing for vertical adjustment of the rack 47 by turning of said set screw, the slot 58 of said screw being accessible from the top of the table for obtaining a zero reading of the dial 43 when the weighing table 4 is unloaded.

After all the parts associated with the table 4 have been assembled on the base 1 as shown in Fig. 3, but before enclosing these parts in the casing 2, the indicating dial 43 is set at zero by adjustment of the set screw 56 in the manner described above. A load, such as a weight corresponding to the predetermined capacity of the weighing device, is then placed on the table 4, after which the lower adjusting member 31 is turned on the threaded boss 19 to raise, or lower, the member 31 as it turns in the lower convolutions of the weighing spring 29, until the reading on the dial 43 corresponds to the weight of the known load which has been placed on the table 4. In other words, by manipulation of the member 31, there is obtained exactly the desired active length of the working coils of the spring 29 to give the reading on the dial. After the above described adjustment has been made, the member 31 is locked in position by the member 38 and this adjustment is not changed as long as the particular weighing spring on which the adjustment has been made is used in the device. The casing 2 is then placed in position to enclose the table and associated parts and secured to base 1 by the screws 16.

In using the device for the testing of springs, the spring 15 to be tested is placed on the top of the table 4 and the handle 9 turned to move the head 12 downwardly to engage the top of the spring and compress the same until the scale 13 indicates the length at which it is desired to know the compressive strength of the spring. When the mark on the guide 14 registers with the mark on the scale 13 corresponding to the desired overall length of the spring under test, the dial 43 is conveniently read through the opening 44 provided in the casing 2. In testing springs of different lengths and of different degrees of compressibility, uniform results will always be obtained over the whole range of readings on the dial, between zero and the maximum reading. This is because the weighing spring 29 is supported by the members 30 and 31 in such a manner that all of the coils of the active length of the spring, as determined by the setting of the member 31, offer uniform resistance to compression. Therefore, when the spring 29 has once been adjusted for the maximum dial reading, no further adjustment thereof is necessary during the life of the spring. Furthermore, downward movement of the table 4, as a spring is compressed, is always symmetrical with respect to the spring axis and without appreciable friction, due to the provision of the sets of balls 24 between the stud 18 and sleeve 17.

I claim:

1. In a spring testing device, the combination with a base, and a yieldingly supported weighing table thereon, of an indicator journaled in the base, a pinion for said indicator, a rack having an integral ball at one end thereof by which said rack is pivotally secured to the table, a spring by which said rack is normally held resiliently in engagement with said pinion, an adjusting screw positioned in said table and engageable with the ball for adjusting said rack longitudinally relative to the table by adjustment of the pivotal connection of said rack relative to said table, and a spring for holding the ball at the end of the rack against said adjusting screw.

2. In a testing device, the combination with a base, a yieldingly supported weighing table thereon, a plunger supported above and in spaced relation to the table, and means for moving said plunger toward and away from said table for applying a compressing force to a test piece positioned between said table and plunger, of a compression coil spring having plain ends positioned beneath said table, members having helical grooves therein corresponding to the normal pitch of the compression spring and engaging with the end coils thereof, one of said members engaging with the weighing table and being held against rocking movement thereon to provide a connection between said spring and table, and the other of said members engaging with the base to provide a connection between said spring and base, said last member being supported against movement on said base, at least one of said members being turnable relative to the spring for adjusting the effective length thereof, and cooperating guide means on the table and base and positioned within and centrally of the spring for guiding the table to assure movement thereof in a direction parallel to the axis of said compression spring.

3. In a testing device, the combination with a base, a yieldingly supported weighing table thereon, a plunger supported above and in spaced relation to the table, and means for moving said plunger toward and away from said table for applying a compressing force to a test piece positioned between said table and plunger, of a compression coil spring having plain ends positioned beneath said table, members having helical grooves therein corresponding to the normal pitch of the compression spring and engaging with the end coils thereof, one of said members engaging with the weighing table and being held against rocking movement thereon to provide a connection between said spring and table, and the other of said members engaging with the base to provide a connection between said spring and base, and cooperating guide means on the table and base positioned within and centrally of the spring for guiding the table to assure movement thereof in a direction parallel to the axis of said compression spring.

4. In a testing device, the combination with a base a yieldingly supported weighing table thereon, a plunger supported above and in spaced relation to the table, and means for moving said plunger toward and away from said table for applying a compressing force to a test piece positioned between said table and plunger, of a compression coil spring having plain ends positioned beneath said table, members having helical grooves therein corresponding to the normal pitch of the compression spring and engaging with the end coils thereof, one of said members engaging with the weighing table and being held against rocking movement thereon to provide a connection between said spring and table, a stud on the base engageable with the other of said members to support the latter against rocking movement and to provide for turning movement of said member relative to the spring for adjusting the effective length of said spring, and cooperating guide means on the table and base and positioned within and centrally of the spring for guiding the table to assure movement thereof in a direction parallel to the axis of said compression spring.

5. In a testing device, the combination with a base, a yieldingly supported weighing table thereon, a plunger supported above and in spaced relation to the table, and means for moving said plunger toward and away from said table for applying a compressing force to a test piece positioned between said table and plunger, of a compression coil spring having plain ends positioned beneath said table, members having helical grooves therein corresponding to the normal pitch of the compression spring and engaging with the end coils thereof, one of said members engaging with the weighing table and being held against rocking movement thereon to provide a connection between said spring and table, a stud on the base engageable with the other of said members to support the latter against rocking movement and to provide for turning movement of said member relative to the spring for adjusting the effective length of said spring, cooperating guide means on the table and base and positioned within and centrally of the spring for guiding the table to assure movement thereof in a direction parallel to the axis of said compression spring, and anti-friction means positioned in said guide means to assure a free movement of the table in the desired direction.

6. In a testing device, the combination with a base, a yieldingly supported weighing table thereon, a plunger supported above and in spaced relation to the table, and means for moving said plunger toward and away from said table for applying a compressing force to a test piece positioned between said table and plunger, of a compression coil spring having plain ends positioned beneath said table, members having helical grooves therein corresponding to the normal pitch of the compression spring and engaging with the end coils thereof, one of said members engaging with the weighing table and being held against rocking movement thereon to provide a connection between said spring and table, and the other of said members engaging with the base to provide a connection between said spring and base, cooperating guide means on the table and base positioned within and centrally of the spring for guiding the table to assure movement thereof in a direction parallel to the axis of said compression spring, an indicator journalled in the base externally of the spring, and means providing a connection between the table and said indicator for indicating the extent of movement of the table in the operation of the device.

7. In a testing device, a base, a yieldingly supported weighing table thereon, a compression coil spring having plain ends positioned beneath the table, members having helical grooves therein corresponding to the normal pitch of the compression spring and engaging with the end coils thereof, one of said members engaging with the under side of the weighing table and being held against rocking movement thereon to provide a connection between said spring and table, and the other of said members engaging with the base to provide a connection between said spring and base, said last member being supported against movement on said base, at least one of said members being turnable relative to the spring for adjusting the effective length thereof, and cooperating guide means on the table and base and positioned within and centrally of the spring for guiding the table to assure movement thereof in a direction parallel to the axis of said compression spring.

8. In a testing device, a base, a yieldingly supported weighing table thereon, a compression coil spring having plain ends positioned beneath the table, helically grooved means engaging with the opposite end coils of the spring and providing a connection between the table and the spring at one end of said spring and between the base and said spring at the opposite end thereof, the means at one end of said spring being turnable relative to the spring for adjusting the effective length thereof, and cooperating guide means on the table and base and positioned within and centrally of the spring for guiding the table to assure movement thereof in a direction parallel to the axis of said compression spring.

ERIC E. ESSEN.